United States Patent [19]

Bhatnagar et al.

[11] Patent Number: 5,370,792
[45] Date of Patent: Dec. 6, 1994

[54] APPARATUS FOR REMOVING WAX PARTICLES FROM CIRCULATING WATER FROM SPRAY BOOTHS

[75] Inventors: Satpal Bhatnagar, Vaihingen; Ralf Gonser, Stuttgart; Joachim Lorenzen, Stuttgart; Wolfgang Tobisch, Stuttgart, all of Germany

[73] Assignee: Duerr GmbH, Stuttgart, Germany

[21] Appl. No.: 62,910

[22] Filed: May 11, 1993

[30] Foreign Application Priority Data

May 11, 1992 [DE] Germany ............... 4215396

[51] Int. Cl.⁵ .................... B01D 21/00; C02F 1/40
[52] U.S. Cl. ..................... 210/167; 210/187; 210/195.1; 210/242.1; 210/540
[58] Field of Search .......... 210/167, 187, 242.1, 210/259, 519, 538, 540, 525, 526, 527, 195.1

[56] References Cited

U.S. PATENT DOCUMENTS

| | | | |
|---|---|---|---|
| 2,118,157 | 5/1938 | Camp | 210/519 |
| 2,670,848 | 3/1954 | van Houten et al. | 210/540 |
| 2,935,197 | 5/1960 | Marple | 210/540 |
| 2,981,525 | 4/1961 | Umbricht | 210/167 |
| 3,015,621 | 1/1962 | Quast | 210/519 |
| 3,598,501 | 8/1971 | Stanfield et al. | 415/7 |
| 4,132,645 | 1/1979 | Bottomley et al. | 210/187 |
| 4,422,931 | 12/1983 | Wolde-Michael | 210/519 |
| 4,551,246 | 11/1985 | Coffing | 210/540 |
| 4,783,257 | 11/1988 | Morioka et al. | 210/167 |
| 4,818,388 | 4/1989 | Morioka et al. | 210/167 |
| 5,244,573 | 9/1993 | Horisawa | 210/540 |

FOREIGN PATENT DOCUMENTS

| | | |
|---|---|---|
| 0065382 | 11/1982 | European Pat. Off. . |
| 3919350 | of 0000 | Germany . |
| 2322792 | 11/1974 | Germany . |
| 2857092 | 11/1980 | Germany . |
| 3119627 | 12/1982 | Germany . |
| WO88/00856 | 2/1988 | WIPO . |

OTHER PUBLICATIONS

G. Beerwerth, et al., "Wasser und Wachs, eine gute Mischung," Konservierung, JOT 1992, Heft 5, pp. 56–59.
Patents Abstracts of Japan–Abstract No. 2-233165, vol. 14, No. 544, Dec. 4, 1990.

Primary Examiner—Christopher Upton
Attorney, Agent, or Firm—Barry R. Lipsitz

[57] ABSTRACT

In order to improve an apparatus for removing wax particles from circulating water from spray booths, comprising a system tank, to which the circulating water coming from the spray booth can be fed via an inlet, such that an efficient removal of wax particles from the circulating water is possible, it is suggested that a separation zone be provided in the system tank following the inlet, the wax particles floating up into a layer near the surface in this separation zone, and that an intake of a suction means for a floating phase comprising the layer near the surface be arranged in the system tank on a side of the separation zone opposite to the inlet.

26 Claims, 5 Drawing Sheets

APPARATUS FOR REMOVING WAX PARTICLES FROM CIRCULATING WATER FROM SPRAY BOOTHS

The invention relates to an apparatus for removing wax particles from circulating water from spray booths, comprising a system tank, to which the circulating water coming from the spray booth can be fed via an inlet. In particular, the inventive apparatus serves to remove hydrowax from the circulating water from hydrowax spraying booths, in which, for example, a final protection coat is applied to motor vehicles after their completion.

In the apparatuses known so far, the circulating water rests in a collecting tank connected to the outlet of the system tank so that the wax particles float to the top of this tank and are removed from the surface by scraper elements.

In apparatus of this type, the resulting discharge of the wax particles has, however, been unsatisfactory.

The object underlying the invention is, therefore, to improve an apparatus of the generic type such that an efficient removal of wax particles from the circulating water is possible.

This object is solved in accordance with the invention, in an apparatus of the type described at the outset, in that a separation zone is provided in the system tank following the inlet and in this separation zone the wax particles float up into a layer near the surface, and that an intake of a suction means for a floating phase comprising the layer near the surface is arranged in the system tank on a side of the separation zone opposite to the inlet.

As a result of the inventive solution it is possible for a separation of the wax particles to already take place in the system tank, in the separation zone, i.e. in that the wax particles in the separation zone float up into the layer near to the surface so that an increased concentration of the wax particles results in this layer which is then removed by suction, preferably together with the foam layer forming on the surface of the circulating water. This means that, on the one hand, there is no necessity to add foaming agents to the circulating water and, on the other hand, a concentration of the wax particles in the drawn-off phase has already taken place following the system tank.

In accordance with the invention, the intake is arranged such that it is always possible with this intake to draw off the floating phase by suction, i.e. the layer near the surface and the floating or foam layer floating on the surface. In this respect it would, of course, be possible to regulate the amount of circulating water in the system tank and thereby attain a constant level of the circulating water surface. However, it is even more simple for the intake to be arranged in the system tank such that it is possible with this intake to draw off the floating phase by suction independently of the level of the circulating water surface in the system tank.

Constructionally, this may be realized particularly easily in that a floating pump comprising the intake is arranged in the system tank.

In order, on the other hand, not to introduce foreign impurities from the spray booths into the system tank, in which they would interfere with the concentration of the wax in the layer near to the surface, a separator for foreign impurities is connected to the inflow side of the inlet.

Appropriately, this separator for foreign impurities is designed such that it separates coarse sinking and floating particles out of the circulating water.

In this respect, it is favourable for the separator for foreign impurities to comprise a pan for receiving coarse sinking impurities.

Furthermore, it is also favourable for an element to be arranged in the separator for foreign impurities which retains coarse particles floating up above a liquid level.

This element is preferably designed such that it comprises openings for the circulating water.

From a constructional point of view, a solution has proven to be particularly expedient, in which the element forms the inlet into the system tank so that the system tank follows on immediately after the separator for foreign impurities.

With respect to the design of the inlet, no additional details have so far been given. It has proven expedient for the inlet to be designed such that it generates an inlet flow directed approximately parallel to the surface of the circulating water in the system tank. The inlet flow directed in such a manner assists in the separation of the wax particles in the separation zone and, in particular, their floating to the top.

An inlet flow of this type may be favourably attained when the inlet is provided with a baffle plate creating the inlet flow.

Moreover, it is advantageous for sustaining the effect of the separation gone when the inlet extends over a considerable portion of the width of the separation zone or the system tank, in a transverse direction to the direction of flow approximately parallel to the surface of the circulating water, in order to, in particular, generate the inlet flow substantially over the entire width and to sustain the effect of the separation zone.

The function of the separator for foreign impurities is particularly advantageous when, in this separator, a liquid surface of the circulating water is at a predetermined level since, in this case, the pan containing sinking coarse impurities as well as the element retaining floating coarse particles can be arranged relative to one another in a simple manner.

In order to generate the desired inlet flow described in the above, it is, in addition, favourable for the liquid surface in the separator for foreign impurities to be maintained at the same level as the circulating water surface in the system tank or slightly higher so that the circulating water does not drop from the separator for foreign impurities into the system tank but flows over from the separator for foreign impurities into the system tank essentially parallel to the surface of the circulating water.

For this purpose, the separator for foreign impurities is preferably arranged in the system tank. In order to maintain the aforementioned condition, the separator for foreign impurities is, in particular, arranged in the system tank so as to be vertically adjustable relative to the surface of the circulating water.

No additional details have so far been given with respect to further treatment of the phase floating in the system tank. In a particularly preferred embodiment of the inventive apparatus, the phase floating in the system tank is feedable to a physical flotation unit, in which wax particles float to the top as flotate due to a physical emulsion separation and a clear phase results. The advantage of such an emulsion separation is the fact that an additional increase in the concentration of the wax particles in the flotate is possible due to a physical or, if necessary, chemically aided process.

Alternatively or supplementarily to the first flotation unit, a thermal flotation unit is provided, in which a phase separation takes place due to a thermal emulsion separation and wax particles float to the top as a flotate phase and a clear phase results.

The flotate of the physical flotation unit can, in particular, be concentrated even more by the flotate of the physical flotation unit being transferred to a second flotation unit. The thermal flotation unit therefore undertakes, in particular, a further concentration of the wax particles in the flotation phase, and supplements the physical or physical/chemical emulsion separation of the physical flotation unit by means of a thermal emulsion separation.

It is particularly favourable for the phase which is to be separated to be heated in the thermal flotation unit to a temperature of between approximately 50° C. and approximately 80° C. In order to save energy during the heating up of the flotate in the thermal flotation unit, it is advantageous for the thermal flotation unit to be encased in a housing.

In this respect, the housing is appropriately designed, in addition, to be thermally insulated.

The flotate phase of the thermal flotation unit can preferably be fed for additional concentration of the wax particles to a subsequent dewatering means which is designed in the simplest case as a filter having a filter sack. However, other types of dewatering means, such as filter presses, band filters, band filter presses or centrifuges, are also conceivable.

No details have been given within the scope of the aforementioned embodiments as to how the flotation units operate.

A particularly expedient function of the flotation unit results when the phase to be separated can be introduced into a flotation zone of the flotation unit, in which the wax particles float to the top to form the flotate.

Moreover, the flotation unit is advantageously provided with a device for removing the flotate.

The removing device can operate in the most varied manner. In the simplest case, the removing device removes the flotate continuously. It is, however, even more advantageous for the flotation unit to comprise a control which controls the removing device such that it removes the flotate at intervals. This has the great advantage that during the intervals the wax particles can be further concentrated in the flotate to form a very high concentration and, therefore, the removed flotate is considerably more concentrated than in the case where a constant, rapid removal of the flotate takes place.

In addition, it is advantageous for the flotation unit to comprise a dewatering zone and for the removing device to transfer the flotate to the dewatering zone. In this dewatering zone, a further concentration of the flotate is possible since the liquid from the flotate flows back into the flotation unit and, therefore, the liquid proportion of the flotate is lower.

It is particularly advantageous for the flotate to remain in the dewatering zone during an adjustable dewatering time. Such an adjustable dewatering time can be realized in the most varied manner. It would, for example, be conceivable to have the removing device pass through the dewatering zone particularly slowly. It is, however, even more advantageous for the flotate to rest in the dewatering zone during a predeterminable dewatering time and for the liquid to be withdrawn from the flotate during this time. In the simplest case, the dewatering zone is formed by an ascending ramp following the flotate zone.

In the case of the physical flotation unit, it is expedient for the flotate to be transferrable from the dewatering zone to the thermal flotation unit. This is preferably not done directly but via an intermediate sludge buffer which temporarily stores, mixes and homogenizes the flotate fed to it in batches from the physical flotation unit and continuously feeds this flotate to the thermal flotation unit.

In the case of the thermal flotation unit, the flotate phase formed can be fed directly to a subsequent dewatering after passing through the dewatering zone.

Additional features and advantages are the subject matter of the following description as well as the drawings of one embodiment. In the drawings.

Figure 1:
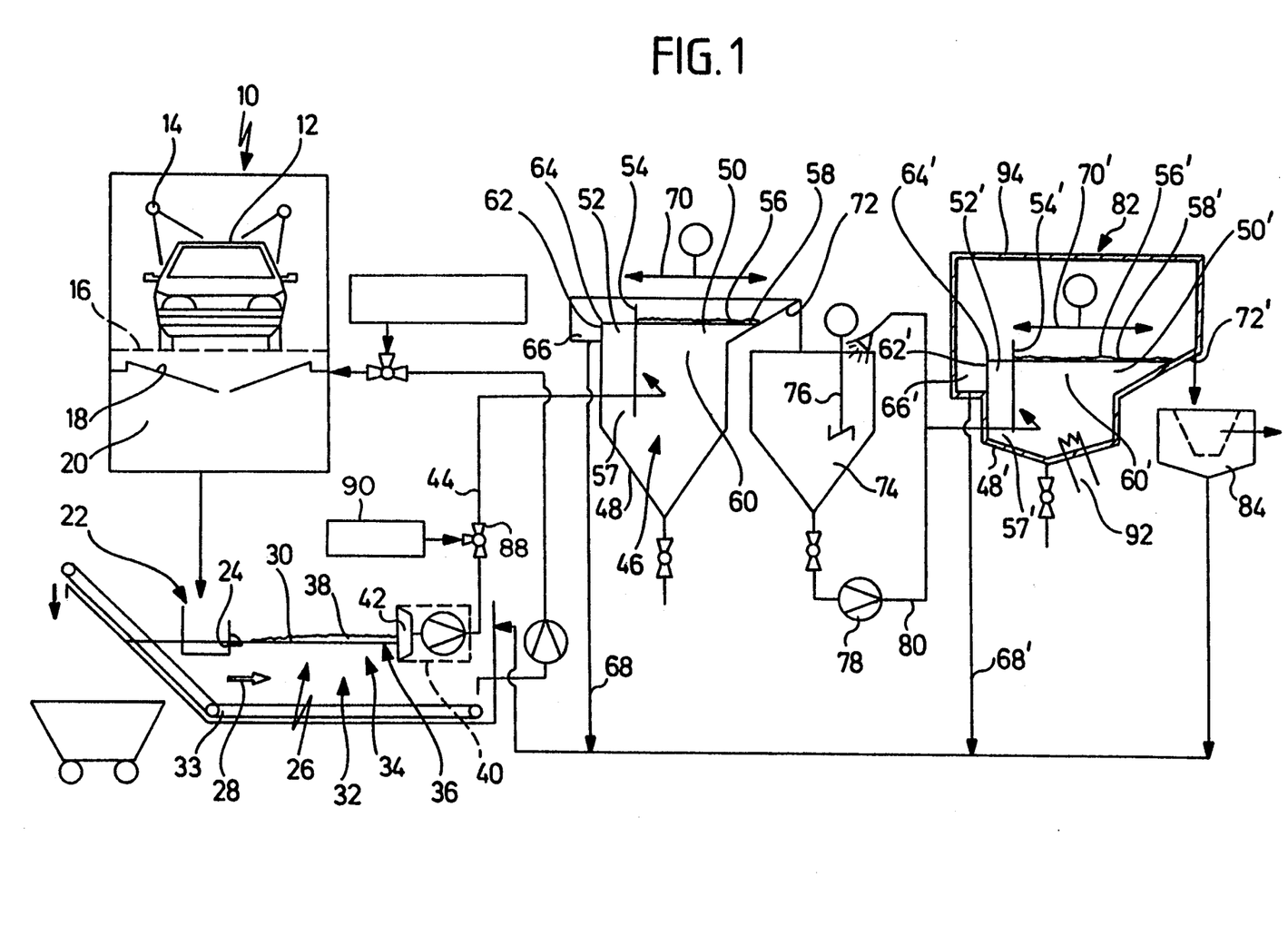
FIG. 1 is a schematic illustration of an inventive apparatus.

An inventive apparatus illustrated schematically in FIG. 1 comprises a hydrowax spray booth designated as a whole as 10, in which motor vehicle bodies 12 are given a final protection coat of wax by spray means 14. The wax sprayed past the substrate passes through a grating floor 16 into a washing out means 18 flushed by circulating water from a circuit, is collected in a collecting chamber 20 and fed to a separator for foreign impurities designated as a whole as 22. From this separator 22 for foreign impurities, the circulating water carrying along wax from the spray booth 10 enters a system tank designated as a whole as 26 on one side thereof via an inlet 24. The circulating water entering the system tank 26 has a direction of flow 28 which extends approximately parallel to a circulating water surface 30.

Following the inlet 24, a separation zone 34 is provided in the system tank 26 comprising a bath 32 for the circulating water. In the course of this separation zone, a separation of the wax overspray in the circulating water takes place in that fine wax particles float up into a layer 36 near the surface and form a floating layer 38 together with foam also forming on the surface 30 of the circulating water, whereas other coarse dirt particles sink to the floor of the system tank 26 and are removed with a floor scraper conveyor 33.

Following the separation zone 34, the floating layer 38 and the layer 36 near the surface are removed by suction by a floating pump 40 which is arranged on the side of the separation zone 34 opposite the separator 22 for foreign impurities and comprises an intake 42. During removal by suction, the intake 42 picks up, as floating phase of the system tank 26, the floating layer 38 together with the layer 36 near the surface.

The phase floating in the system tank 26 is fed by the floating pump 40 via a line 44 to a first or physical flotation unit designated as a whole as 46. This first flotation unit 46 comprises a flotation tank 48, in which a flotation zone 50 and a clear phase zone 52 are arranged. These two zones are separated from one another by a dividing wall 54 dipping into the flotation tank 48. An underflow opening 57 is provided between the dividing wall 54 and the flotation tank 48 and clear phase can pass through this opening from the flotation zone 50 into the clear phase zone 52.

The line 44 opens into the flotation zone 50, in which a physical separation of the floating phase of the system tank 26 takes place, at the same temperature as in the system tank 26, in that wax particles and foam float to the top as flotate 56 and form a layer which swims on a surface 58 of a liquid phase 60. A clear phase is formed from this liquid phase 60 and this enters the clear phase zone 52 via the underflow opening 57.

An overflow wall 62 is provided in the clear phase zone 52 and the upper edge 64 of this wall determines the surface 58 of the liquid phase and the clear phase. The clear phase in the clear phase zone 52 flows over the upper edge 64 of the overflow wall 62 into an outlet 66 and, from there, it is conducted back into the system tank 26 via a clear phase line 68.

The layer of flotate 56 floating up to the surface 58 in the flotation zone 50 is removed by a removing device 70, moved into a dewatering zone 72 and, from there, passed in batches to a buffer tank 74, in which the flotate 56 is preferably stirred with a stirring device 76 to keep the flotate 56 homogeneous. To prevent the formation of foam in the buffer tank 74, this is provided in addition with a nozzle arrangement 75 for destroying the foam which can be operated by means of a pump 78 and a line 80.

The flotate 56 can be fed from the buffer tank 74 by means of the pump 78 and via the line 80 to a second or thermal flotation unit 82 which is, in principle, of exactly the same design as the flotation unit 46 and produces a flotate phase by means of thermal emulsion separation. This flotate phase can be transferred to a subsequent dewatering unit 84. In addition, a clear phase is also formed in the subsequent dewatering unit 84 and this can be conveyed into the clear phase line 68 and through this to the system tank 26.

In the case of the second flotation unit 82, those parts which are identical to those of the first flotation unit have been given the same reference numerals, with ' added. With regard to the description of these parts reference can, therefore, be made to the comments on the first embodiment.

In contrast to the first flotation unit 46, the second flotation unit 82 comprises a heater 92 in the flotation zone 50' and a housing 94 which surrounds the second flotation unit 82 and insulates this thermally against the surrounding atmosphere.

In the second flotation unit, the flotate 56 from the first flotation unit can be heated to a temperature of between approximately 50° C. and approximately 80° C. whereas in the system tank 26 and in the first flotation unit 46 no heating up takes place and the temperatures of the circulating water and the floating phase are between approximately 15° C. and approximately 20° C.

Depending on the type of wax, phase separating agent is already added in the line 44 via a dosaging device 88 and a supply means 90.

Figure 2:
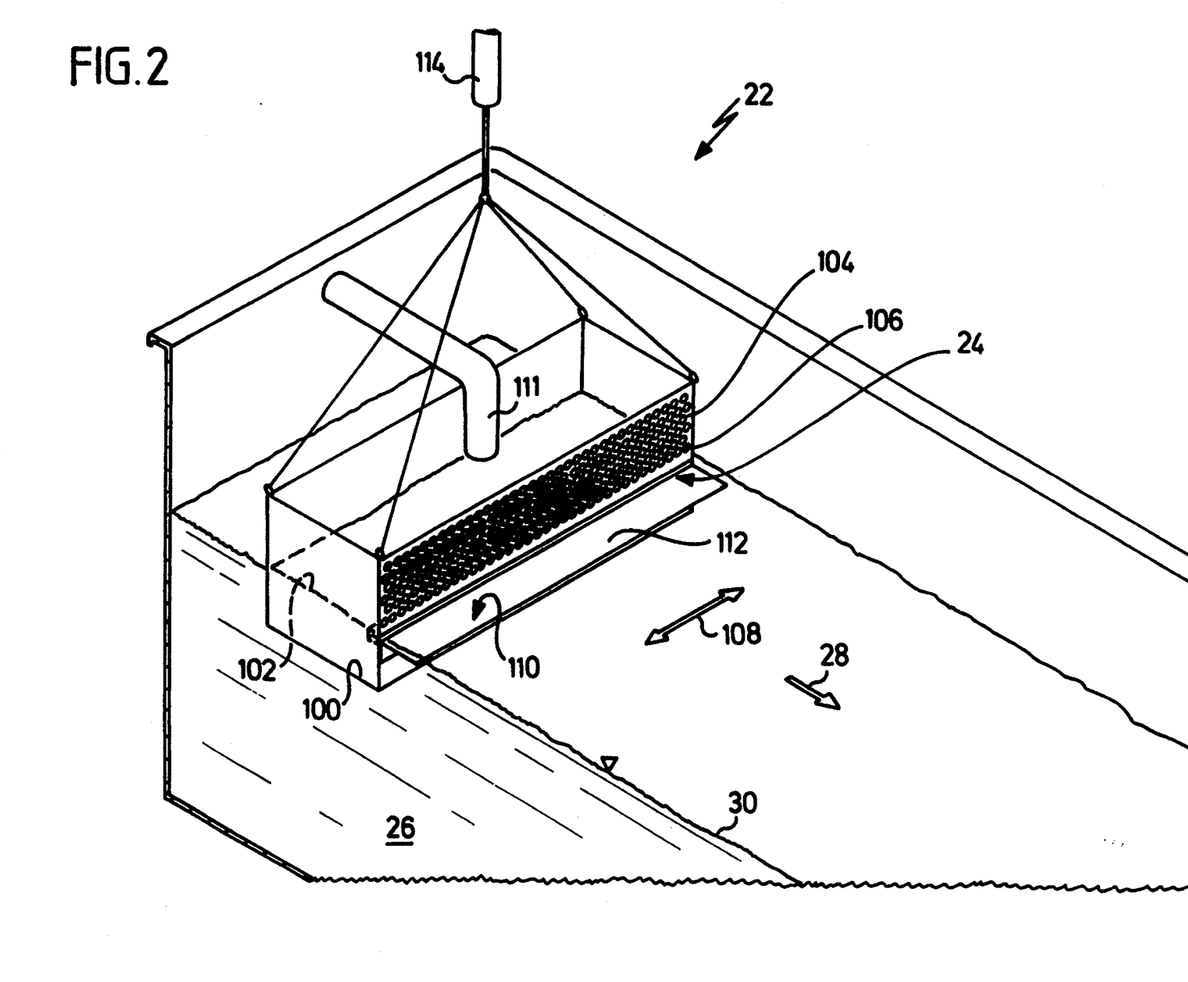
FIG. 2 is a perspective illustration of an embodiment of an inventive separator for foreign impurities.

A preferred embodiment of a separator 22 for foreign impurities, illustrated in FIG. 2, comprises a collecting pan 100, which is closed in the lower region up to a fluid level 102 of the circulating water in the separator for foreign impurities 22. A retaining element 104, which is arranged above the level of liquid 102 on a side wall and designed as a perforated sheet with openings 106, serves to determine this liquid level. The liquid level 102 is hereby determined by the lowermost openings 106 of the retaining element.

The retaining element 104 is arranged such that circulating water flows out of the collecting pan 100 through the openings 106 into the system tank 26, and such that it is distributed over a transverse direction 108 extending parallel to the surface 30 of the circulating water and transversely to the direction of flow 28.

In order to keep the direction of flow 28 essentially parallel to the surface 30 of the circulating water, a baffle plate 110 having a baffle surface 112 aligned essentially parallel to the surface 30 of the circulating water is provided beneath the openings 106 of the retaining element 104 forming the inlet 24. The baffle surface likewise extends over the transverse direction 108 beneath the openings 106 and therefore gives the circulating water flowing in through the inlet 24 into the system tank 26 the direction of flow 28 which is approximately parallel to the surface 30 of the circulating water.

The circulating water coming from the spray booth 10 is supplied to the collecting pan 100 via an inlet connection pipe 111, is spread out in the collecting pan, whereby non-floating coarse particles, such as, for example, screws etc., are deposited on the bottom of the collecting pan 110, and then flows out of the collecting pan 100 through the openings 106 of the perforated sheet 104 into the system tank 26. In this respect, the perforated sheet 104 retains coarse waste, such as paper cups or similar floatable parts, floating on the liquid surface 102 in the collecting pan.

In order to always ensure that the inlet 24, assisted by the baffle surface 112 of the baffle plate 110, generates a flow 28 in the system tank which is directed essentially parallel to the surface 30 of the circulating water, the entire separator 22 for foreign impurities is held in the system tank 26 so as to be vertically adjustable by way of a lifting means 114. It is always adjusted such that the baffle surface 112 is slightly below the surface 30 of the circulating water in the system tank 26 and, therefore, the liquid surface 102 is approximately at the same level as the surface 30 of the circulating water or slightly above this.

Figure 3:
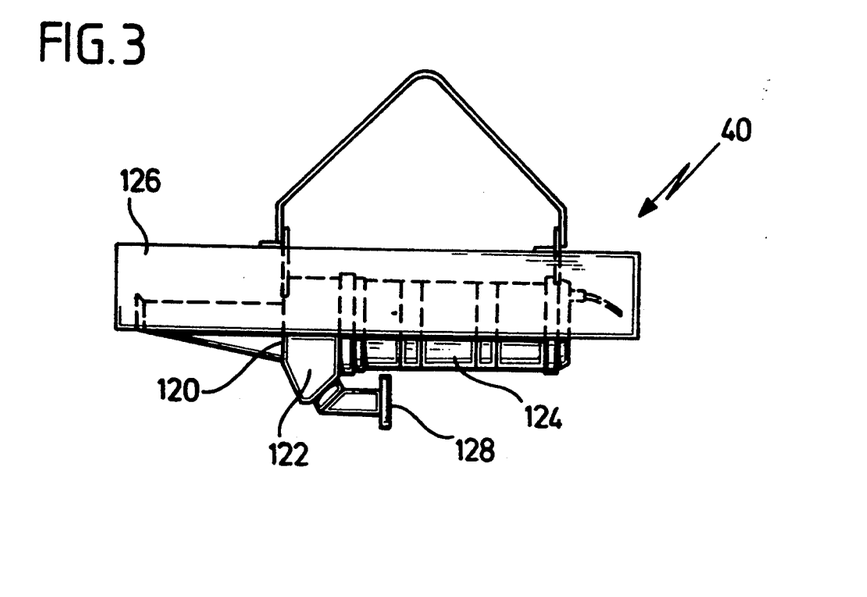
FIG. 3 is a side view of a floating pump.
Figure 4:
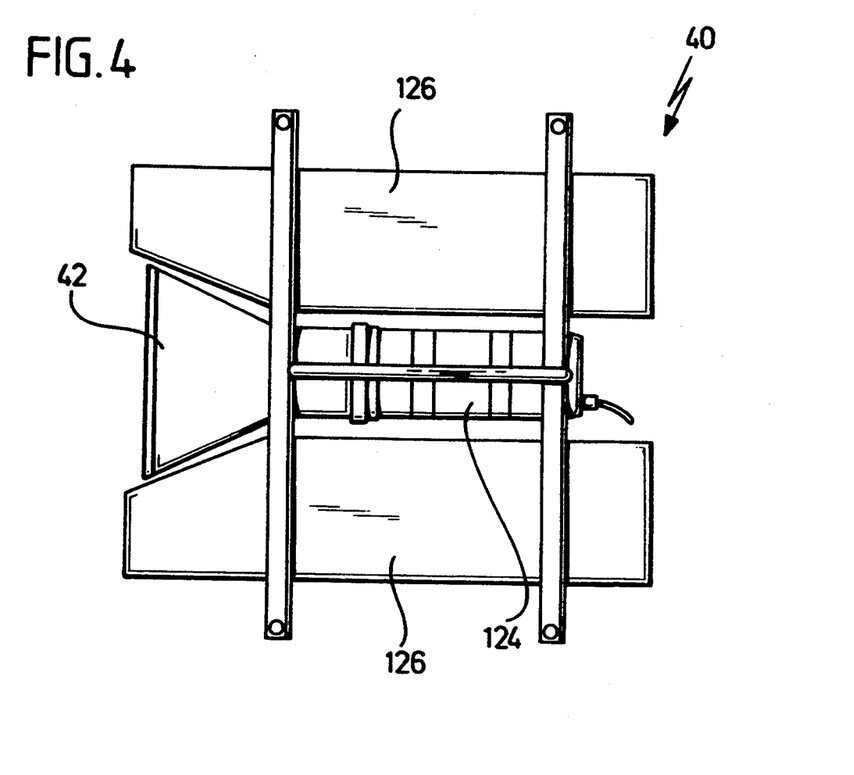
FIG. 4 is a plan view onto the floating pump according to FIG. 3.

As illustrated in FIGS. 3 and 4, the floating pump designated as a whole as 40 comprises the intake 42 which is arranged facing the separation zone 34 and also the separator 22 for foreign impurities and tapers conically as far as a pump intake 120 of a pumping unit 122, the pumping unit 122 being driven by a motor 124. The pumping unit 122 and the motor 124 are held by floating members 126 arranged on both sides thereof so that they float in the system tank 26 and such that the intake 42 catches the phase floating in the separation zone 34, i.e. the layer 36 close to the surface and the floating layer 38, and supplies this to the pump intake 120. The floating phase is then drawn off by the pumping unit 122 via an outlet connection pipe 128.

Figure 5:
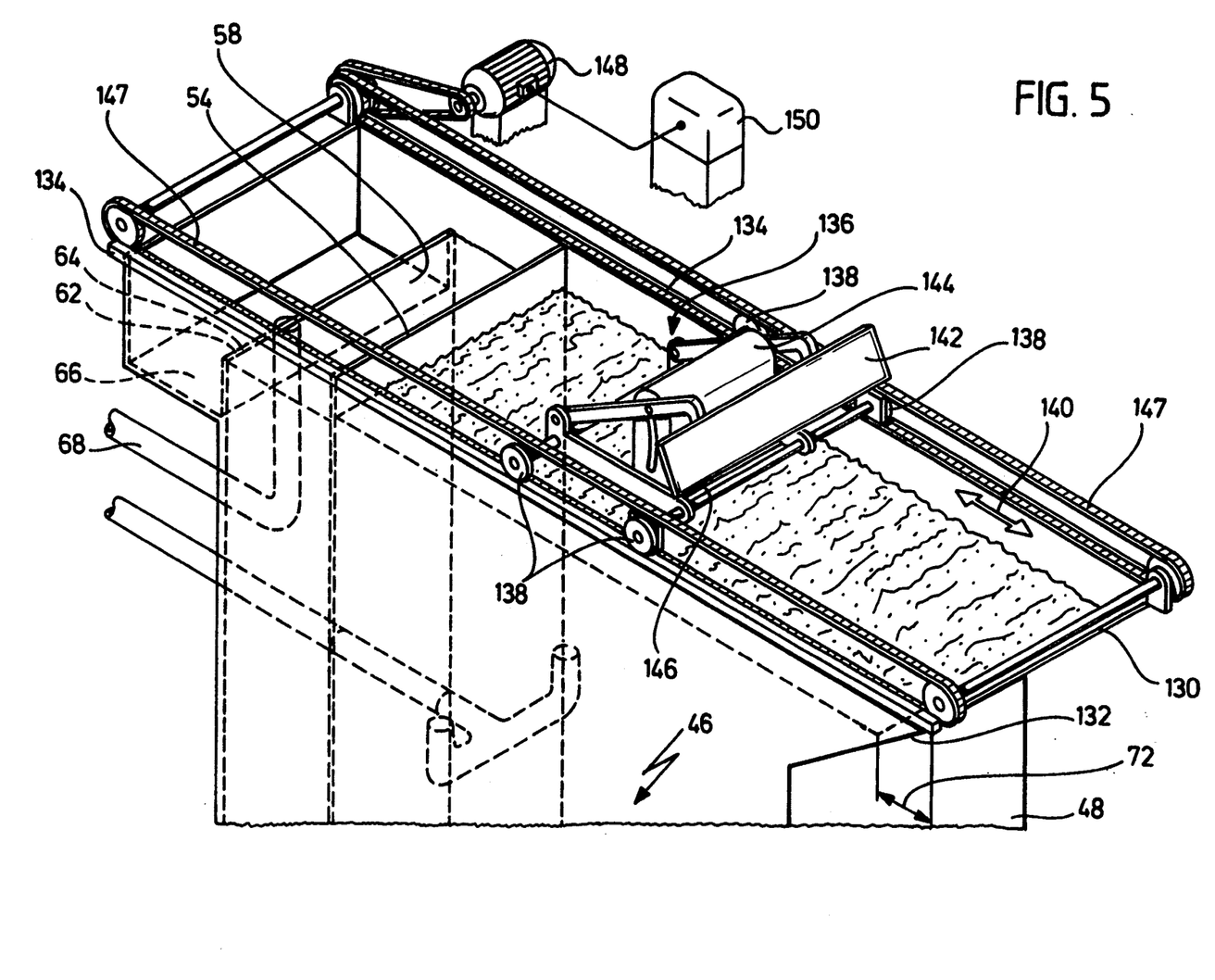
FIG. 5 is a perspective illustration of a top part of a flotation unit with raised removing device and FIG. 6 is a schematic illustration similar to FIG. 5 with the removing device removing the flotate.
Figure 6:
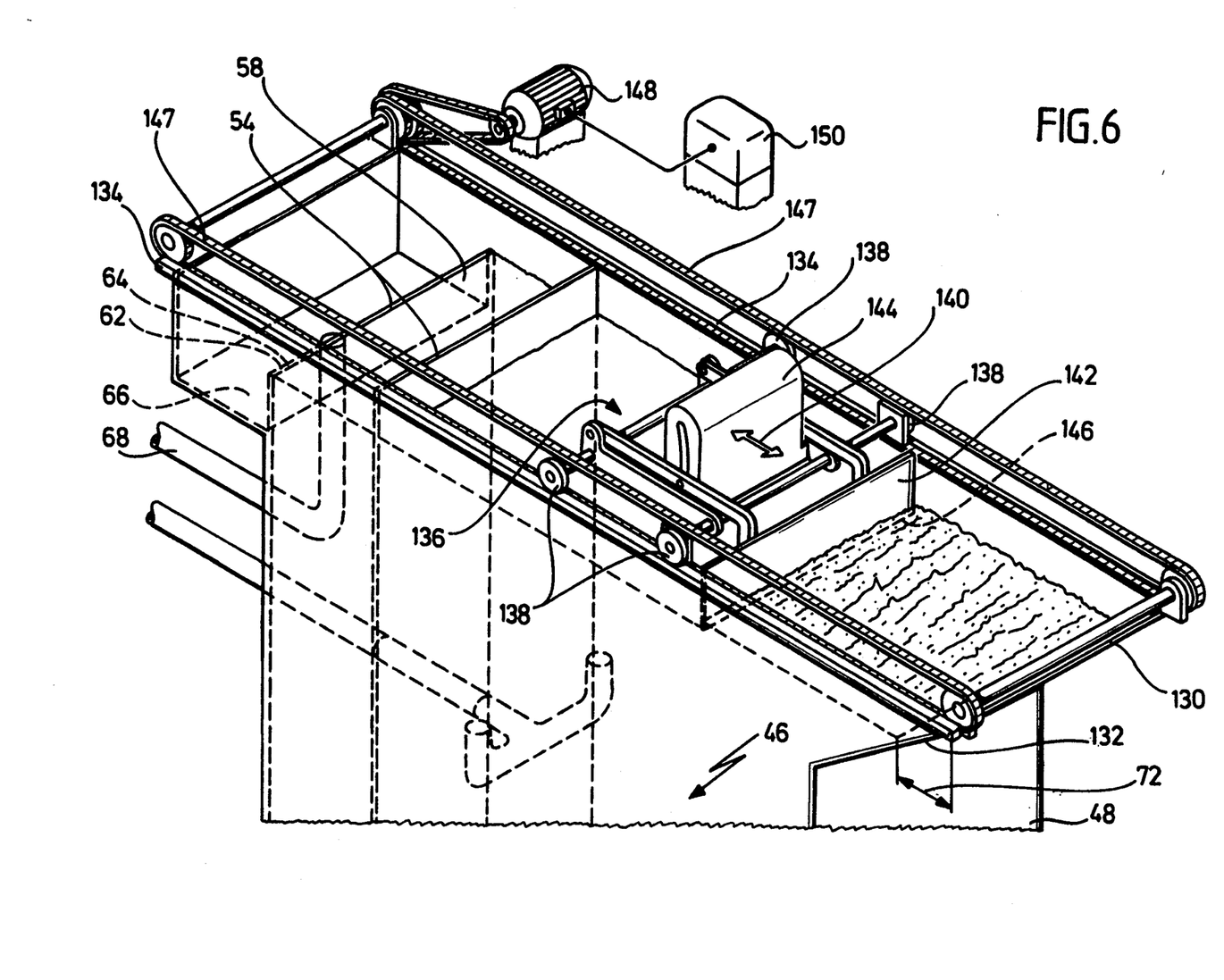

As illustrated in FIGS. 5 and 6, each of the flotation units 46 comprises the flotation tank 48 with the dewatering zone 72, which is formed by a wall region 132 of the flotation tank 48 which extends at an angle upwards starting from the surface 58 and proceeding as far as a discharge edge 130.

The removing means comprised by the flotation unit 46 has two rails 134 which are arranged parallel next to one another and on which a removing carriage 136 with rollers 138 is guided and movable parallel to the rails 134 in a removing direction 140, away from the dividing wall 54 in the direction towards the wall region 132 and vice versa. The removing carriage 136 hereby bears a removing blade 142 which is held by a lifting means 144 arranged on the removing carriage 136 so as to be raised and lowered. In this respect, the removing blade dips into the liquid phase 60 with a lower edge 146 in the lowered state whereas, in the lifted state, the lower edge 146 is displaceable over the layer of the flotate 56 floating on the surface 58.

The removing carriage 136 is moved in the removing direction 140 and contrary thereto by means of drag chains 147 which are arranged near to the rails 134 and are drivable via a traction drive 148.

Both the traction drive 148 as well as the lifting means 144 are controllable via a control 150 such that in variably predeterminable time intervals the removing blade 142 is moved in the lifted state as far as the dividing wall 54, contrary to the removing direction 140. Then, in the lowered state, the removing means removes the layer of flotate 56 from the surface 58 in the removing direction 140 and pushes this in the direction towards the dewatering zone 72 and, in the dewatering zone 72, shifts the flotate layer onto the inclined wall region 132.

The dewatering zone 72 is either passed through at a low speed so that a sufficient time is available for dewatering the flotate 56 or the removing blade 142 is stopped in its movement in the removing direction 140 at a point in the dewatering zone 72 so that liquid from the removed flotate 56 can flow back over the wall region 132 into the liquid phase 60 in the flotation tank 48.

Following dewatering of the flotate 56 in the dewatering zone 72, the removing blade 142 moves this on as far as the discharge edge 130, proceeding from which the flotate layer falls into the buffer tank 74, in which a uniform mixing via the mixing unit 76 and a temporary storing take place prior to the continuous introduction of the flotate 56 into the second flotation unit 82, in which a removal and dewatering of the flotate phase forming therein can be performed in the same manner as in the first flotation unit 46.

This flotate phase is then passed, for example, into a filter device as subsequent dewatering device 84.

The present disclosure relates to the subject matter disclosed in German application No. P 42 15 396.4 of May 11, 1992, the entire specification of which is incorporated herein by reference.

What is claimed is:

1. Apparatus for removing wax particles sprayed past a substrate to be coated with wax, comprising:
    a spray booth for spraying wax onto said substrate;
    a system tank comprising a water bath;
    a water circulation system for circulating water between said system tank and said spray booth for carrying along wax sprayed past said substrate in said spray booth;
    an inlet disposed within said water circulation system for feeding circulating water coming from said spray booth into said water bath of said system tank in a direction of flow;
    a separation zone provided in said system tank following said inlet, said separation zone extending in a direction of flow of said water fed into said water bath, said separation zone enabling said wax particles to float up into a floating layer near a surface of said water bath, said floating layer being part of a floating phase formed in said separation zone; and
    a floating pump floating in said water bath and comprising an intake arranged in said bath on a side of said separation zone opposite said inlet viewed in a direction parallel to said surface of said water bath;
    said intake being arranged with respect to said surface of said bath such that said floating phase is drawn off by suction of the floating pump irrespective of a surface level of said water bath.

2. Apparatus in accordance with claim 1 further comprising:
    a flotation unit coupled to an output of said floating pump for receiving the floating phase drawn off by said pump;
    said flotation unit providing a clear phase due to a physical emulsion separation resulting in said wax particles floating to a liquid surface in said flotation unit as a flotate.

3. Apparatus in accordance with claim 2 wherein said flotation unit is divided into a clear phase zone and a flotation zone, said floating phase being received in said flotation zone where said wax particles float to said liquid surface.

4. Apparatus in accordance with claim 2 further comprising:
    means for removing said flotate floating on said liquid surface from said flotation unit.

5. Apparatus in accordance with claim 4 further comprising:
    a controller coupled to said removing means for periodically actuating said removing means to remove said flotate from said liquid surface.

6. Apparatus in accordance with claim 5 wherein said flotation unit comprises a dewatering zone and said removing means transfer said flotate from said liquid surface to said dewatering zone.

7. Apparatus in accordance with claim 6 wherein said flotate remains in said dewatering zone for an adjustable dewatering period established by the periodic actuation of said removing means.

8. Apparatus in accordance with claim 7 wherein said dewatering period is adjustable via said controller.

9. Apparatus in accordance with claim 6 wherein said flotation unit comprises:
    a flotation zone for receiving said flotation phase, and
    an ascending ramp following said flotation zone for forming said dewatering zone.

10. Apparatus in accordance with claim 6 further comprising:
    a sludge buffer coupled to receive said flotate from said dewatering zone; and
    a second flotation unit coupled to receive said flotate from said sludge buffer.

11. Apparatus in accordance with claim 1 further comprising:
    a thermal flotation unit coupled to receive the wax particles contained in the floating phase drawn off by said pump;
    said thermal flotation unit providing a clear phase due to a thermal emulsion separation resulting in said wax particles floating to a liquid surface in said thermal flotation unit as a flotate.

12. Apparatus in accordance with claim 11, wherein said thermal flotation unit comprises a heater for heating the flotate to be separated therein to a temperature in a range of about 50° C. to 80° C.

13. Apparatus in accordance with claim 12 further comprising a housing enclosing said thermal flotation unit.

14. Apparatus in accordance with claim 13 wherein said housing is a thermally insulated housing.

15. Apparatus for removing wax particles sprayed past a substrate to be coated with wax, comprising:
   a spray booth for spraying wax onto said substrate;
   a system tank comprising a water bath;
   a water circulation system for circulating water between said system tank and said spray booth for carrying along wax sprayed past said substrate in said spray booth;
   an inlet disposed within said water circulation system for feeding circulating water coming from said spray booth into said water bath of said system tank, said inlet being designed such that it generates an inlet flow in a direction of flow being approximately parallel to a surface of said water bath;
   a separation zone provided in said system tank following said inlet, said separation zone extending in said direction of flow of said water fed into said water bath, said separation zone enabling said wax particles to float up into a floating layer near a surface of said water bath formed in said separation zone; and
   an intake arranged in said bath on a side of said separation zone opposite said inlet viewed in said direction of flow, said intake being connected to a suction source and arranged with respect to said surface of said bath such that said floating layer is drawn off by suction irrespective of a surface level of said water bath.

16. Apparatus in accordance with claim 15 further comprising:
   a floating pump floating on the surface of said water bath, said floating pump containing said intake.

17. Apparatus in accordance with claim 15 further comprising:
   a separator coupled to an inflow side of said inlet for separating foreign impurities from said circulating water.

18. Apparatus in accordance with claim 17 wherein said separator is adapted to separate coarse sinking and floating particles from said circulating water.

19. Apparatus in accordance with claim 18 wherein said separator comprises a pan for receiving coarse sinking waste.

20. Apparatus in accordance with claim 18 wherein said separator comprises a retainer extending above the surface of said water bath for retaining coarse particles floating above said surface.

21. Apparatus in accordance with claim 20 wherein said retainer has openings for allowing said circulating water to pass therethrough.

22. Apparatus in accordance with claim 20 wherein said retainer is mounted to said inlet.

23. Apparatus in accordance with claim 17, wherein said water circulates through said separator, and said separator comprises means to maintain a surface of the water circulating therethrough at a predetermined level.

24. Apparatus in accordance with claim 23, wherein said predetermined level is at or slightly above the surface of said water bath.

25. Apparatus in accordance with claim 15 wherein said inlet comprises a baffle plate for creating said inlet flow.

26. Apparatus in accordance with claim 15 wherein said inlet extends in a transverse direction to said direction of flow, approximately parallel to said surface of said water bath.

* * * * *